United States Patent [19]

Gault et al.

[11] Patent Number: 5,063,388

[45] Date of Patent: Nov. 5, 1991

[54] METHOD FOR THE ASSIGNING OF RADAR RECURRENCES TO RADIALS TO BE DISPLAYED AND IMAGE DIGITAL CONVERTER TO IMPLEMENT SAID METHOD

[75] Inventors: Dominique Gault, Ville36'Avray; Jean-Pierre Andrieu, Paris; Jean-Claude Henri, Boulogne Billancourt, all of France

[73] Assignee: Thomson-CSF, Puteaux, France

[21] Appl. No.: 455,441

[22] PCT Filed: May 17, 1988

[86] PCT No.: PCT/FR88/00250

§ 371 Date: Nov. 15, 1989

§ 102(e) Date: Nov. 15, 1989

[87] PCT Pub. No.: WO88/09514

PCT Pub. Date: Dec. 1, 1988

[30] Foreign Application Priority Data

May 22, 1987 [FR] France ................. 87 07206

[51] Int. Cl.$^5$ .................... G01S 7/298; H04N 7/01
[52] U.S. Cl. ..................... 342/185; 358/140
[58] Field of Search ............ 342/185; 358/140

[56] References Cited

U.S. PATENT DOCUMENTS

| 4,580,164 | 4/1986 | Andrieu et al. | 342/185 X |
| 4,660,043 | 4/1987 | Lachaize et al. | 342/185 |
| 4,729,029 | 3/1988 | Henri et al. | 358/140 X |
| 4,740,789 | 4/1988 | Henri et al. | 342/185 |
| 4,757,317 | 6/1988 | Henri et al. | 342/185 |
| 4,774,516 | 9/1988 | Henri et al. | 342/185 |

FOREIGN PATENT DOCUMENTS 0099832 2/1984 European Pat. Off. ........... 342/285

Primary Examiner—Gilberto Barrón,acu/o/ n, Jr.
Attorney, Agent, or Firm—Pollock, Vandesande & Priddy

[57] ABSTRACT

A method is disclosed for assigning radar recurrences to radials to be displayed.

A converter has means receiving an antenna rotation signal (68) and a radar synchronization signal ($SY_R$), and groups incident recurrences in radials to be displayed as follows:

memorization of the incident radials at the rate of their arrival in one of the memories of a group of three with, as the case may be, grouping of the incident recurrence with the already memorized recurrence, with the number of memory being written in getting incremented by one unit at the first blip $SY_R$ following the reception of a blip $\epsilon$; and reading of a memory during the reception of a blip $\epsilon$ in order to constitute a radial, the number of the memory to be read being obtained by deducting 1 from the number of memory being written in at this moment.

8 Claims, 6 Drawing Sheets

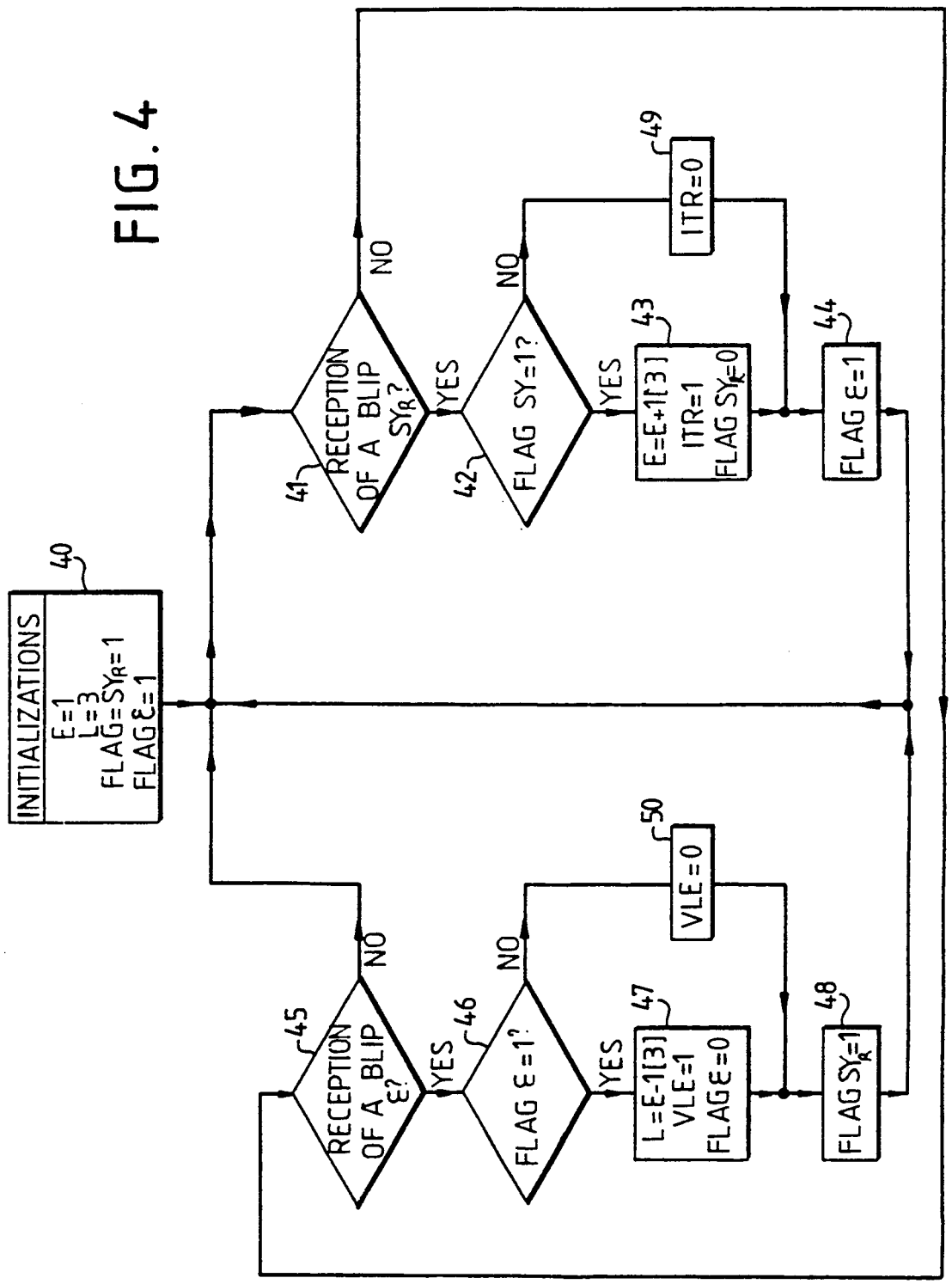

METHOD FOR THE ASSIGNING OF RADAR RECURRENCES TO RADIALS TO BE DISPLAYED AND IMAGE DIGITAL CONVERTER TO IMPLEMENT SAID METHOD

FIELD OF THE INVENTION

The present invention concerns the display of radar information by means of an image digital converter. Its object more particularly is a method for assigning radar recurrences to radials to be displayed, as well as its means of implementation.

BACKGROUND OF THE INVENTION

When it is desired to display an image given in polar coordinates, such as a radar image, on a display device working in television mode, generally a device known as an image digital converter or IDC is used, having the essential role of converting the image in polar coordinates into an image in Cartesian coordinates, and of memorizing it in digital form, so a to provide for the matching between the rate at which the images are supplied and the rate at which the television image is refreshed.

In a standard way, an IDC comprises: a radar interface circuit which receives the video signals coming from the radar and provides for their digitalization; a coordinates conversion sub-set; a memory, called an image memory, wherein the radar information is stored in digital form in the format in which it will be displayed. Connected to the image memory, the IDC further comprises artificial persistence circuits which have the role of creating, for the pieces of information of the image memory for which there are no modifications due to the ageing, a persistence effect comparable to the one produced on a persistence tube where the brilliance of a point starts decreasing as soon as it is recorded. In a system such as this, the process of writing in the memory is the following one.

The video signal is formed by the responses (echos) to a pulse emitted by the radar. It is given at a frequency which is the frequency at which the emission of these pulses is repeated, called the pulse repetition frequency or PRF. It must be noted that the PRF is determined by the range of the radar. The video signals given at the PRF are hereinafter called "recurrences".

To do its conversion, the coordinates conversion sub-set receives "rotation signals" which have the role of indicating, at any instant, the angular position of the beam of the radar, which rotates regularly with respect to a reference direction, generally the North. The rotation signals are formed, firstly, by a North signal (N) which is a pulse, or blip, whenever the beam passes through the North and, secondly, by an angle increment blip ($\epsilon$) indicating that the beam has rotated by $1/n^{th}$ with respect to the preceding increment, if n increments correspond to 360°.

The angle increment blips $\epsilon$ are generally given by the antenna encoder, asynchronously with the recurrences. $\theta$ designates the resultant angle, at a given instant, made by the radar beam with the reference direction (North). The video information assigned to each of the n directions $\theta$ of the beam is hereinafter called a "radial".

When the radar system gives n angle increments, it is generally desired to display n radials. It is then necessary to assign the different recurrences to the different radials. The different points of each radial thus formed are then recorded in image memory at the addresses computed in Cartesian coordinates.

However, as the periodicity of the angle increments $\epsilon$ is given by the antenna, and as the PRF is determined, besides, by the range of the radar, it appears that, in certain cases, these values may be such that one of the following configurations exists:

either the frequency of the increments $\epsilon$ is too low as compared with the PRF: among the recurrences received at the PRF, there are then recurrences which correspond to no value whatsoever of $\theta$. They are either not recorded in memory and are lost or they are grouped together beforehand in a way which may be not constant from one radial to another or from one antenna rotation to another, and recorded in memory. The result thereof is an error in the positioning of the echos. Furthermore, this error may vary from one antenna to another;

or the frequency of the increments $\epsilon$ is too high as compared with the PRF and there are angle $\theta$ values for which there is no corresponding radar information (recurrences) available: there is then no memory recording for want of information. The drawback therein is, notably, an irregularity of the image for want of a radial from time to time, as well as the disturbance of the working of the remanence.

To avoid this latter drawback, we are led, in practice, to modify the PRF in a direction that leads to limiting the range of the radar.

Another approach is described in the European patent Application, published under n° 0.192.562 on behalf of THOMSON-CSF, corresponding to U.S. Pat. No. 4,757,317, wherein the periodicity of the increments $\epsilon$ is converted into a signal $\epsilon'$ as a function of the PRF of the radar in order to prevent any loss of information. The conversion of coordinates and the assignment of the recurrences is then done according to the converted value $\epsilon'$. This method amounts to restricting the number of effectively displayed radials as compared with the number of values of the angle $\theta$ given by the antenna, i.e. the number of radials that it may be possible to display, whence a restriction in the quality of the image displayed.

BRIEF DESCRIPTION OF THE INVENTION

The present invention enables these latter faults and limitations to be avoided by enabling the display of as many radials as there are angle $\theta$ values given by the antenna. It enables the incident recurrences to be assigned to the radials to be displayed irrespectively of the type of radar, i.e. irrespectively of the ratio FIGS. 1a, 1b and 1c illustrate the method for quantification in distance of the incident radar video signal;

FIGS. 2a and 2b are conceptual plots of radials as employed to explain the invention; (radials), thus enabling the use of the IDC to be optimized.

More precisely, the IDC implementing the method according to the invention includes a sub-set receiving the signal $\epsilon$ and a radar synchronization signal $SY_R$ consisting of pulses, or blips, at the PRF and fulfilling a grouping function as follows:

memorizing of the incident recurrences at the rate of their arrival (PRF) in one of the memories of a group comprising m memories, m being at least equal to 3, the identification of the memory written in being recurrence with an already memorized recurrence;

reading of at least one memory upon reception of each blip $\epsilon$, the identification of the memory read being obtained from that of the memory written in at this instant.

Other objects, particular features and results of the invention will emerge from the following description, given as a non-restrictive example and illustrated by the appended drawing which represent:

FIGS. 1a, 1b, 1c and 2a, 2b explanatory diagrams of the process of quantification and grouping of the incident radar information;

FIG. 4 is a flowchart of the method according to the invention;

In these different figures, the same references refer to the same elements.

FIG. 1a illustrates, as a function of time, the video analog signal, referenced 12, as given by the radar receiver.

This figure also shows the radar synchronization blips marked $SY_R$, emitted in synchronism with the emission of the radar pulse, the video signal 12 of which forms the response. Rec designates a recurrence, namely the radar video signal between two blips $SY_R$, referenced 10 and 11.

Figure 1A:
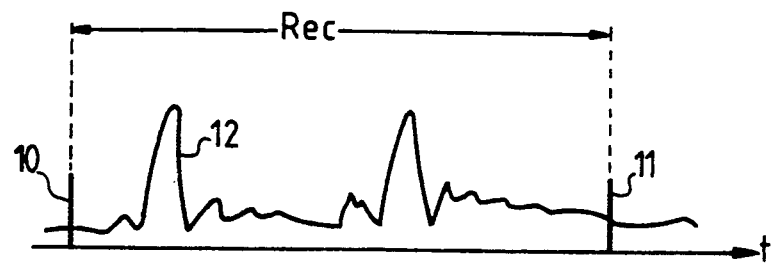
Figure 1B:
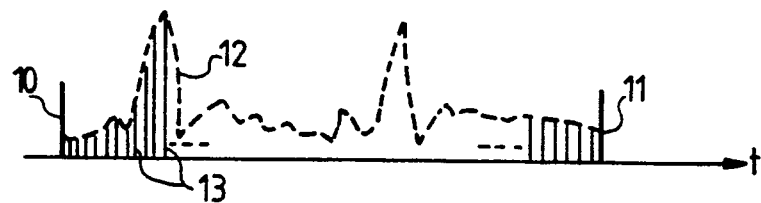

The input interface of the IDC has the function of digitalizing this analog video signal: this is what is shown in FIG. 1b, where the same recurrence Rec is seen again and where there is shown a set of samples, referenced 13, with a frequency $H_E$, the envelope of this set of samples 13 being the video signal 12. Each of the samples is expressed in digital form in b bits.

As is known, the sampling frequency is a function of the pulse width of the radar. The total number of samples necessary between two blips $SY_R$ may be great and may exceed the processing possibilities of the IDC. These samples are then grouped in what are hereinafter called "quanta", the frequency of which, marked $H_Q$, is smaller than or equal to the sampling frequency $H_e$ and is therefore a function of the maximum processing capacity of the IDC.

Figure 1C:
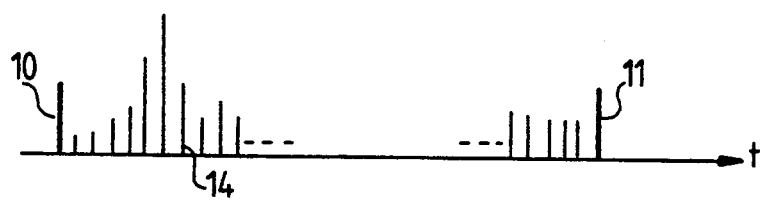

The succession of quanta, referenced 14, is shown in FIG. 1c between the synchronization blips 10 and 11.

The function applied to two (or more) samples to group them in a quantum is, for example, a maximum function, it being understood that other functions are possible, like the mean function.

FIGS. 2, a and b, illustrate the notion of a radial.

Figure 2A:
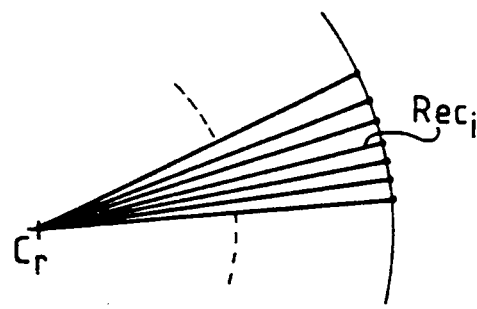

FIG. 2a is a spatial diagram in polar coordinates of a succession of recurrences $Rec_1$, from the center of the radar, marked $C_R$.

It is recalled that each recurrence corresponds temporally to a radar pulse or, again, to a synchronization blip $SY_R$.

As indicated further above, the only piece of angular information available, enabling the video signal represented by the quanta to be placed on a control screen, consists of blips $\epsilon$: it is then necessary to assign, to each recurrence, an angle value obtained by counting blips $\epsilon$, from a temporal origin formed by the North blip.

Figure 2B:
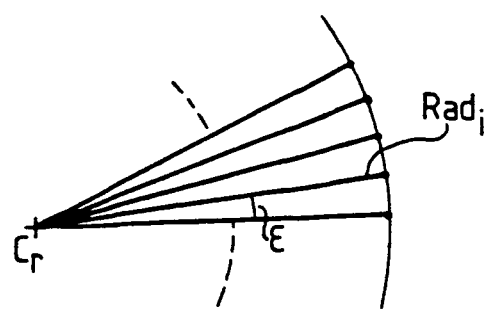

FIG. 2b represents the case where, with the PRF being greater than the frequency $H_E$ of the blips $\epsilon$, a grouping has to be done of the recurrences assigned to one and the same angle value to form a radial, referenced $Rad_i$, each of the radials being separated by an angle $\epsilon$. It has to be noted that, in the present description, $\epsilon$ designates both the pulse, indicating an angle increment, and the angular value of the fraction $360°/n$.

Each quantum of this resultant radial is therefore spatially defined by its distance $\rho$ to the radar center $C_R$ (which is actually given by the number of the quantum, counted from the temporal origin which forms the synchronization blip) and the angle $\theta$ of a radial with reference to the North (which is obtained by counting the blips $\epsilon$ from the temporal origin formed by the North blip).

Figure 3A:
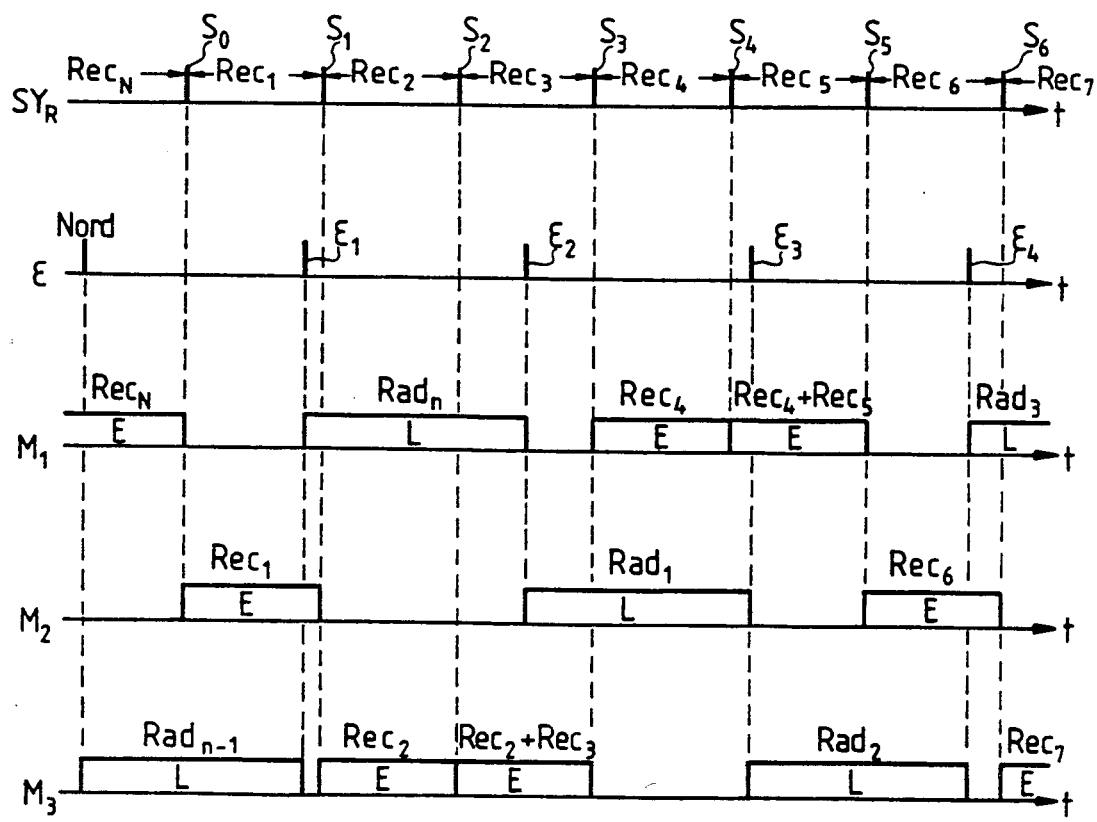
FIGS. 3a and 3b are timing diagrams of the reading and writing of the different recurrences and radials in the method according to the invention.
Figure 3B:
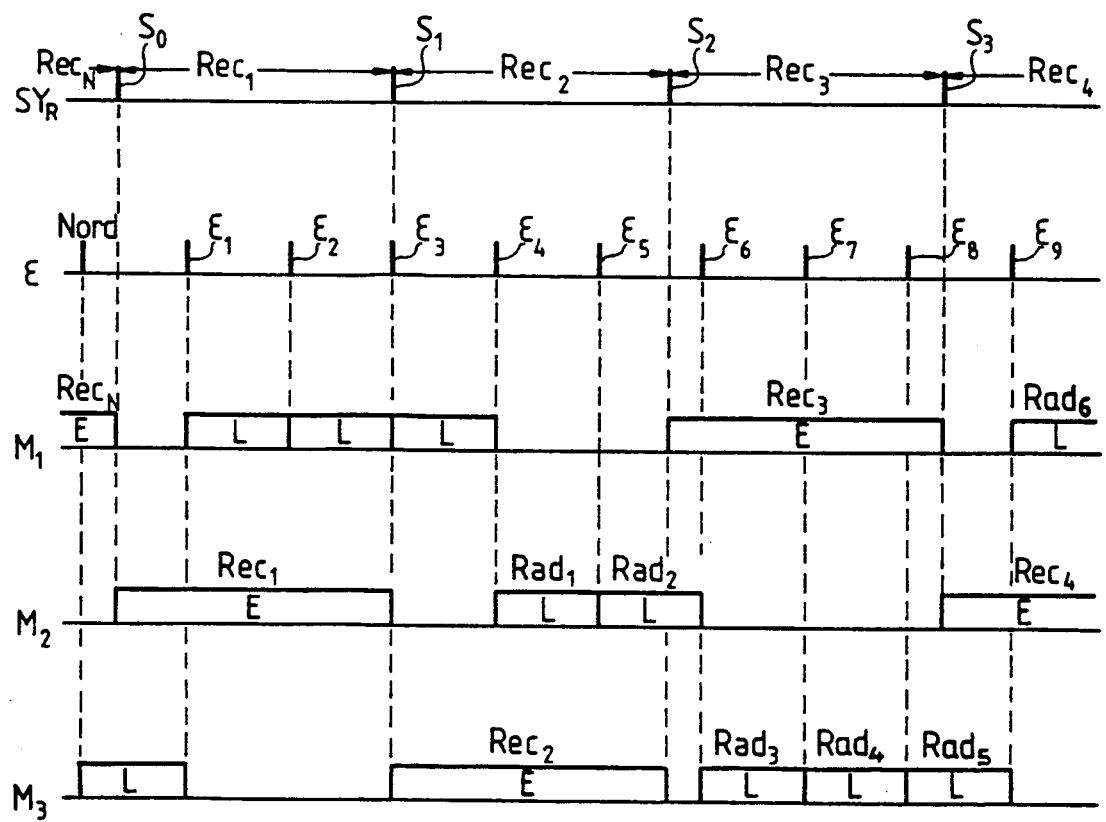

FIGS. 3, a and b, illustrate the method of assignment of incident recurrences to a number of radials to be displayed defined by the radar, this method being carried out by a set of m memories wherein the incident recurrences are written and read according to a particular sequencing. In the example shown in FIGS. 3a and 3b, the number m of memories is equal to 3.

FIG. 3a represents the case where the PRF is greater than the frequency of the blips $\epsilon$.

This is a timing diagram illustrating the sequencing of the synchronization blips $SY_R$ (at the PRF), of the signals $\epsilon$ and of the phases of reading and writing in each of the three memories $M_1$, $M_2$ and $M_3$.

In the first row, representing the synchronization blips $SY_R$, marked $S_0$ to $S_6$, we have also indicated the succession of recurrences: the last recurrence of the preceding antenna rotation, marked $Rec_N$, then the seven first recurrences of a rotation, with indices 1 to 7.

The second line of the diagram shows the blips $\epsilon$, the first one indicating the passage of the radar beam through the North. As the frequency of the blips $\epsilon$ is smaller, in this hypothesis, than the PRF, only four blips $\epsilon$, referenced $\epsilon_1$, $\epsilon_2$, $\epsilon_3$, $\epsilon_4$, given during the first six recurrences, have been shown.

Each of the incident radials is recorded as and when it arrives (at the PRF) in one of the memories $M_1$–$M_3$ starting, for example, with the memory $M_1$ in which the last recurrence of the antenna rotation, marked $Rec_N$, is recorded. The number of the memory being written in is incremented by one unit at the first synchronization blip $SY_R$ which follows the reception of a blip $\epsilon$. In practice, since the synchronization blip $SY_R$ between the recurrences N and 1 ($S_0$) is received just after a blip $\epsilon_1$, in this case the North signal, the number of the memory being written in is incremented by one unit and the first recurrence $Rec_1$ is thus recorded in the memory of $M_2$. In the same way, in the example shown, as the blip $\epsilon_1$ occurs just before the blip $S_1$, the following recurrence $Rec_2$ is recorded in the following memory, namely $M_3$. Again, in the example shown, the periodicity of the blips $\epsilon$ is such that the blip $\epsilon_2$ occurs not before but after the blip $S_2$. As a consequence, the third recurrence $Rec_3$ is assigned to the same memory as the recurrence $Rec_2$.

Furthermore, according to the invention, the information corresponding to the recurrence $Rec_3$ does not overwrite the preceding content of the memory $M_3$, namely the recurrence $Rec_2$, but combines with it according to a grouping function, for example a maximum function. The content of the memory $M_3$ is then, for each quantum, the value of the corresponding quanta of the recurrences $Rec_2$ and $Rec_3$.

As the blip $\epsilon_2$ occurs before the recurrence Rec$_4$, this recurrence is recorded in the next memory, namely the memory $M_1$ (modulo 3) etc.

As regards the reading, one of the memories is read whenever a blip $\epsilon$ is received to form a radial. The number of the memory to be read is obtained by deducting 1 (modulo 3) from the number of the memory which is being written in at the instant when the blip $\epsilon$ is received. On reception of the North blip, the memory being written in in the case of FIG. 3a is the memory $M_1$: the memory being read is therefore the memory $M_3$.

At the blip $\epsilon_1$, which occurs while the memory $M_2$ is being written in, the operation goes to the reading of the memory $M_1$.

At the blip $\epsilon_2$, as the memory being written in is the memory $M_3$, the operation goes over to the reading of the memory $M_2$, which will then form the first radial of the rotation, marked Rad$_1$ etc.

FIG. 3b is similar to FIG. 3a except that, in this example, the frequency of the blips $\epsilon$ is greater than the PRF.

We have therefore shown four recurrences (Rec$_1$, Rec$_2$, Rec$_2$, Rec$_4$) and nine blips $\epsilon(\epsilon_1 \ldots \epsilon_9)$. As above, the recurrences are recorded in memory as and when they arrive, the number of the memory being incremented by one unit for each synchronization blip that immediately follows a blip $\epsilon$.

In reading, the operation also proceeds as above. Since the frequency of the blips $\epsilon$ is greater than that of the synchronization blips (SY$_R$), it is seen that one and the same memory can be read several times to form different radials, i.e. radials separated by an angle increment $\epsilon$, but with a video content which will be identical: this is the case, for example, in the diagram of the first recurrence, Rec$_1$, which is recorded in memory $M_2$ and will be read twice, at the blips $\epsilon_4$ and $\epsilon_5$, to form the first two radials, Rad$_1$ and Rad$_2$.

FIG. 3b further shows the particular case where a blip $\epsilon(\epsilon_3)$ and a blip SY$_R$ (S$_1$) are simultaneous. A priority should then be defined. It is chosen, for example, to consider the blip $\epsilon$ as being prior to the blip SY$_R$. As a consequence, at this instant, the reading continues on the memory $M_1$.

It would appear that the method according to the invention is applicable irrespectively of the PRF/blip $\epsilon$ frequency ratio: whether it is greater than, lower than or even equal to 1, and this is so even if this ratio varies. This is an advantage, notably in the case where, with this ratio being close to 1, it may become greater or smaller than 1 during the normal operation of the radar, the antenna of which may have a motion which is not perfectly regular.

FIG. 4 represents the flowchart of a mode of generation of the identifications (numbers) of memories being written in and being read, as well as certain validation signals in the method according to the invention.

The flowchart starts with a certain number of initialization operations: step 40 in FIG. 4. The address of the memory being written in is called E. It is initialized, for example, at 1. The address of the memory being read is called L, and it is initialized at 3 if the group of memories has m=3 memories. The procedure also includes the initialization of two subsequently used indicator bits or flags, a flag SY$_R$ and a flag $\epsilon$, which are both initialized at 1.

The following step, 41, is a test on the reception of a synchronization blip SY$_R$. In a following step, referenced 42, the value of the flag SY$_R$ is tested. If this value is equal to 1, as is the case after the initialization, the operation goes to the next step (43) which consists in incrementing the value of the memory being written in by one unit (modulo 3), i.e. the memory which should receive the recurrence is the memory $M_2$. At the same time, a bit called ITR is positioned at the value 1, the use of which is explained further below, and the value of the flag SY$_R$, which becomes equal to 0, is modified. In a subsequent step 44, the flag $\epsilon$ is positioned at the value 1 in case it is not so positioned, the incident recurrence is recorded in the memory $M_2$ and there is a looping back to the test 41 of reception of a blip SY$_R$.

Referring to the graph of FIG. 3a, it is now assumed that we are at the instant of reception of the blip $\epsilon_1$; the response to the test 41 is therefore negative and a test (45) then takes place on reception of a blip $\epsilon$. Under the present assumption, the response is yes and the value of the flag $\epsilon$ is tested (step 46). If, as is the case here, it is equal to 1, a bit called VLE is positioned at the value 1 (step 47), the value of the flag $\epsilon$ is changed to the value 0 and the number of the memory being read (L) becomes equal to the number of the memory being written in (E) less one unit (modulo 3). In a following step, referenced 48, the flag SY$_R$ is positioned at 1, the memory is read to form a radial and there is a looping back towards the test for reception of a synchronization blip. In the same way, if a negative response is given to the test (45) of a blip $\epsilon$, a looping back is done towards the test (41) of a blip SY$_R$.

The bit ITR is used during the recording of a recurrence in a memory M. Should this be a recurrence immediately following a blip $\epsilon$, for example Rec$_2$ in memory $M_3$ (FIG. 3a), the recurrence should be recorded in deleting the initial content of the memory $M_3$. On the contrary, during the recording in the same memory ($M_3$) of a second recurrence (Rec$_3$), the content (Rec$_2$) of the memory should not be overwritten but grouped with the incident recurrence. The bit ITR is used to control the two operations corresponding to the two cases: for example, to inhibit the grouping function with ITR =1 in the first case and ITR =0 in the second case. The flag SY$_R$ is used to distinguish the first recurrence following a blip $\epsilon$.

The bit VLE is used when it is desired to trace a radial, the video signal of which is null. In effect, in certain cases of use, it may be desired that the image displayed by means of the IDC has greater resemblance to an image of the type obtained on a screen of the plan position indicator (PPI) type. It is then preferable not to copy one and the same recurrence to form several radials as illustrated in FIG. 3b. Then the bit VLE is used similarly to the bit ITR, to identify the first radial that follows a blip SY$_R$, which alone will be displayed, the following radials being forced to a null value.

Figure 5:
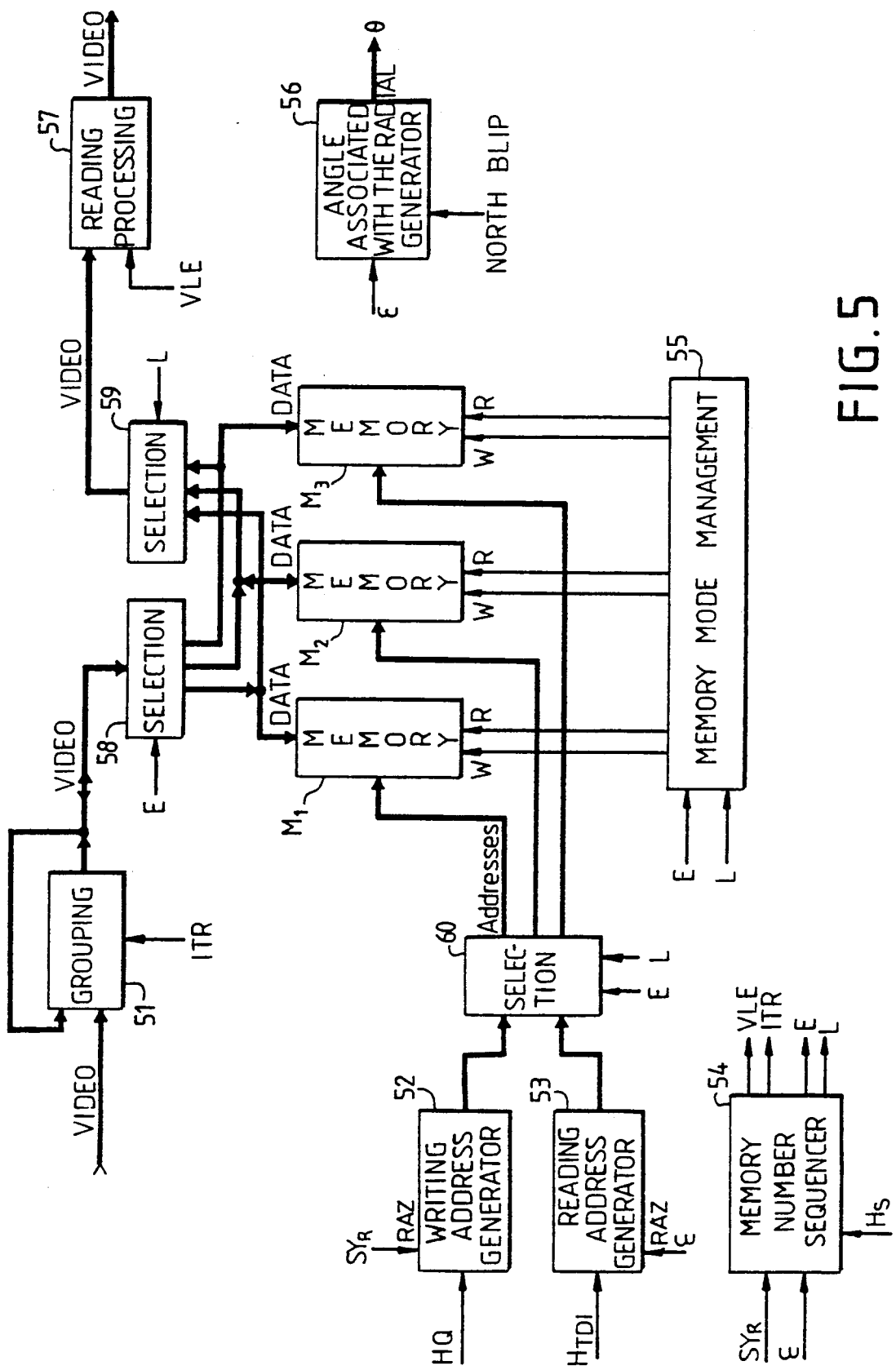
FIG. 5 is an embodiment of the device for implementing the method according to the invention.

FIG. 5 shows an embodiment of the means for implementing the method according to the invention.

The device of FIG. 5 thus comprises, for example, three memories $M_1$, $M_2$ and $M_3$, preceded on the path of the incident recurrences by a grouping circuit 51 which receives these incident recurrences in digital form. The device further has: a writing addresses generator 52, a reading addresses generator 53, a sequencer 54 giving the memory numbers according to the operation described above in FIG. 4, a circuit 55 for managing the modes of operation of the memories $M_1$-$M_3$, a circuit 56 for generating the angle $\theta$ from the blips $\epsilon$ and, as the case may be, a reading processing circuit 57. This circuit further includes selection devices 58, 59 and 60.

The circuit works as follows:

For the writing of a recurrence in memory

An incident recurrence is written in one of the memories, for example $M_1$, after a possible grouping (circuit 51) with the preceding content of the memory $M_1$. The grouping is controlled by the bit ITR given by the sequencer 54. The memory $M_1$ (like the memories $M_2$ and $M_3$) is connected to the grouping circuit 51 by the selection circuit 58 which is itself connected by a bus to the circuit 51. The selection circuit 58 is connected by three buses to the three memories $M_1$-$M_3$ and provides for the shunting of the incident recurrences as a function of the number (E) of the memory where the writing has to be done; the number E is given to the selection circuit 58 by the sequencer 54.

The address at which the information given to the memory $M_1$ should be written is given by the writing address generator 52 formed, for example, by a counter, receiving the rate $H_Q$ of the quanta forming the recurrence. The generator 52 is reset by the blips $SY_R$, i.e. at each recurrence. This address is transmitted to the memory $M_1$ through the selection circuit 60 which, in being connected to the three memories $M_1$-$M_3$, receives the number (E) of the memory being written in and shunts the address accordingly similarly to the selection circuit 58.

Finally, the writing mode (W) of the memory $M_1$ is controlled by the chronometer circuit 55 providing for the management of the modes of the three memories $M_1$-$M_3$, upon reception of the memory numbers E and L.

For the reading of a memory

One of the memories, for example $M_3$, is read on reception of a blip $\epsilon$ to form a radial. This radial is possibly forced to a null value by the reading processing circuit 57 upon activation of the bit VLE. The memory $M_3$, like the memories $M_1$ and $M_2$, is connected to an output bus of the video signal, towards the circuit 57, by means of the selection circuit 59. This latter circuit, in a manner similar to the selector, but with a view to the reading, is connected to each of the memories $M_1$-$M_3$ and does a shunting under the control of the number (L) of the memory being read, given by the sequencer 54.

In a manner similar to that described for the reading stage, the reading address generator 53 gives the addresses to the memory $M_3$ at the rate $H_{TDI}$ at which the quanta have to be given to the downline IDC processing. The generator 53 is reset by each blip $\epsilon$. The address that it gives is shunted by the selection circuit 60. The reading mode (R) is controlled at the memory $M_3$ by the chronometry circuit 55.

It must be noted that, owing to the asynchronism of the different signals, the sequencer 54 should work at a frequency $H_S$ which should be the smallest common multiple of the clocks $H_Q$, $H_\epsilon$ and $H_{TDI}$.

Finally, to be complete, the device of FIG. 5 also includes the circuit 56 for generating the angle $\theta$ associated with the radial given, which is a counter receiving the blips $\epsilon$ and reset by the North blip. The circuit 56 may further provide for a correction of the temporal shift observed, for example, in FIG. 3a, where the radial (Rad$_1$) corresponding to the first recurrence (Rec$_1$) recorded after the North blip will be read after several blips $\epsilon$ (at the blip $\epsilon_2$ in this example).

The above-described method for the assigning of the radar recurrences to radials to be displayed may be used to achieve a function of homogenization by the filling of the image displayed.

It will be recalled that, in an IDC, the process of conversion and display is quantified, and it happens that this gives a "moth-eaten" appearance to the image. It is therefore desirable to homogenize the image at this level by "filling" the holes, that is, by assigning them a luminosity which depends on the environment. The method of correcting faults is known a "pixel filling".

In the context of an IDC, a known approach consists in assigning, to the pixels that are not addressed by the conversion and are therefore dark, a luminosity value which is a function of that of the adjacent pixels, for example that of the eight pixels surrounding the pixel considered. This approach soon comes up against limits, notably related to complexity and cost, when the processing speeds have to be great as is often the case with a radar.

Another approach is described in the French patent application No. 86 00321, corresponding to U.S. Pat. No. 4,774,516 which consists in doing this filling no longer at the level of the pixels of the image memory but at the level of the signal received in polar coordinates (modulus $\rho$, polar angle $\theta$). The method then consists in creating fictitious radials between the real radials, and in assigning a video signal to each of them, as a function of the video signal of the neighboring real radials. More precisely, it is a function of the value of the neighboring video signals which are located at the same value of the modulus $\rho$.

When the assigning of the recurrences to the radials is done as described above, it is possible to further fulfill the homogenization function by adding a fourth memory M to the device, in order to have two memories available simultaneously in reading mode instead of only one. As a result, it is possible to create a supplementary fictitious radial from the two radials read simultaneously.

As compared with the unfolding of the method described further above, the determining of the number of the memory being written remains the same, but modulo 4. The determination of the numbers ($L_1$, $L_2$) of the two memories being read becomes:

$$L_1 = E - 1 \text{ (modulo 4)}$$

$$L_2 = E - 2 \text{ (modulo 4)}$$

This enables a first degree filling to be done, namely one that corresponds to the creation of a fictitious radial between two real radials.

It is also possible to achieve a higher degree (P) filling, i.e. one that corresponds to the creation of several (P) fictitious radials between two real radials. The fictitious radials may then be emitted in parallel or in series. Should they be emitted in series, the emission of a real quantum is then accompanied simply by the emission of P quanta characterized by one and the same modulus $\rho$, but belonging to the P fictitious radials of filling.

Figure 6:
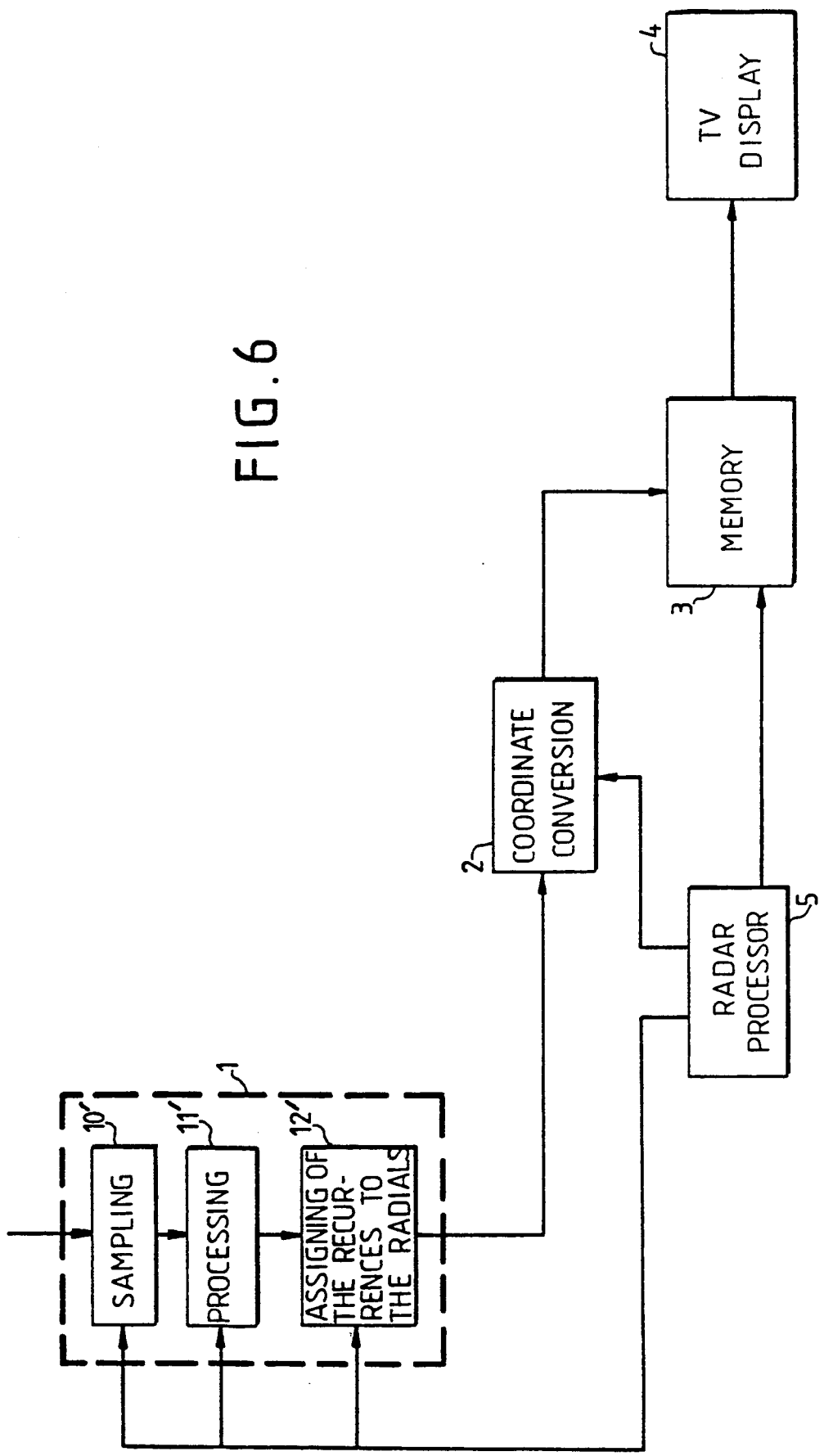
FIG. 6 is the block diagram of an IDC implementing the method according to the invention.

FIG. 6 represents the block diagram of an IDC implementing the method according to the invention.

An ID can be split up into several sub-sets:
a sub-assembly 1, forming an input interface and connected to the radar receiver;
a sub-assembly 2, providing for the conversion of the polar coordinates into Cartesian coordinates;

a memory and remanence sub-assembly 3, in which the radar information is recorded in the format in which it will be displayed in television mode by a device 4.

The chief function of the interface 1 is the sampling of the radar video signal and its digitalization (circuit 10'), possibly certain brief processing operations on this video signal (circuit 11') as well as the memorizing of this information and the assigning of the recurrences to the radials to be displayed: it is a circuit 12' formed, for example, as illustrated in FIG. 5. The radials thus formed and memorized are given to the memory set 3 by means of the coordinates conversion sub-set 2 which enables the computation of the memorized address of each of the points of the radials.

These different sub-sets are controlled and initialized by a processor 5.

We claim:

1. Method for the assigning of recurrences emitted by a radar to radials to be displayed, the recurrences being given at a first frequency which is the repetition frequency (PRF) of the radar and accompanied by a first synchronization signal ($SY_R$) formed by a first sequence of blips at the first frequency, and the radials being given at a second frequency in synchronism with a second synchronization signal ($\epsilon$) formed by a second sequence of blips at the second frequency; the method being characterized by the fact that it comprises the following steps:

memorizing of the recurrences at the rate of their arrival in one of the memories of a group of m memories with $m \geq 3$, the identification of the memory written in being changed at the first blip ($SY_R$) of the first sequence following a blip ($\epsilon$) of the second sequence:

grouping of a recurrence received with the previously received and already memorized recurrence, should there have been no change in said identification of memory;

reading of at least one memory of said group to form a radial, upon reception of each blip ($\epsilon$) of the second sequence, the identification of the memory read being obtained from that of the memory written in at the same instant.

2. Method according to claim 1, characterized by the fact that the second frequency ($\epsilon$) is given by the rotation angle increment signals of the radar beam.

3. Method according to claim 1, characterized by the fact that a recurrence is formed by a sequence of pieces of digital information, called quanta, in that said grouping consists in comparing the same order quanta of the two recurrences and in memorizing the quantum having the highest value.

4. Method according to claim 1, characterized by the fact that the memories are numbered 1 to m, that the identification of the memory being written in consists of its number and that this number is incremented by one unit upon the reception of each blip ($SY_R$) of the first sequence following a blip ($\epsilon$) of the second sequence, modulo m.

5. Method according to claim 4, characterized by the fact that the identification of the memory being read consists of its number, and that this number is obtained in deducting one unit from the number of the memory being written in at the same moment, modulo m.

6. Method according to claim 4, characterized by the fact that the group of memories comprises three memories.

7. Method according to claim 4, characterized by the fact that the group of memories comprises four memories, two of them being simultaneously read, their identification consisting of their number, these numbers being obtained by respectively deducting one and two units from the number of the memory being written in at this instant, modulo 4, the two radials thus obtained enabling a fictitious filling radial to be formed.

8. An image digital converter for receiving radar recurrences which occur at a first frequency corresponding to said radar PRF rate, and for producing radials occurring at a second frequency for display in a television mode comprising:

means for providing a first synchronization signal from a series of blip signals at said first frequency;

means for providing a second synchronization signal from a second series of blips at a second frequency corresponding to said radials frequency;

an interface means for receiving said recurrences including:

at least three memories for storing said recurrences;

a sequencer for supplying said recurrences to said memories, said sequencer changing the identification of a memory to be written with a recurrence, in response to receipt of a blip associated with said first synchronization signal following reception of a blip associated with said second synchronization signal;

means for grouping a later received recurrence with a previously received recurrence stored in one of said memories when said sequencer does not change the identity of a memory to receive said later recurrence;

a generator means for generating an address for writing recurrences to an identified memory in response to said first synchronization signal; and, a second generator for generating an address for reading one of said memories in response to said second synchronization signal, the identity of said read memory being obtained from said memory being concurrently written.

* * * * *